May 8, 1956  A. WRAGG  2,744,425
REAMER
Filed Dec. 7, 1954
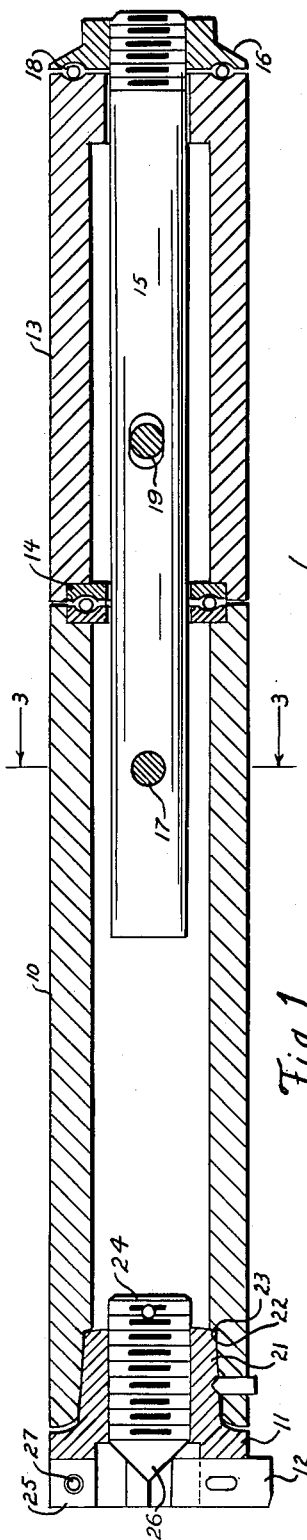
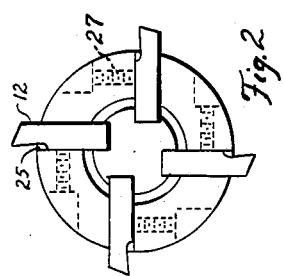
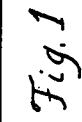
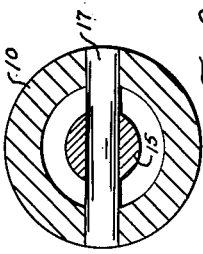
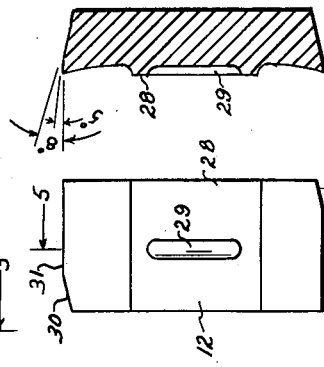
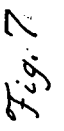
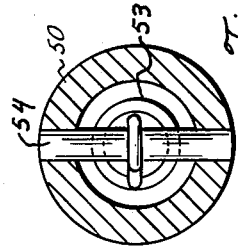
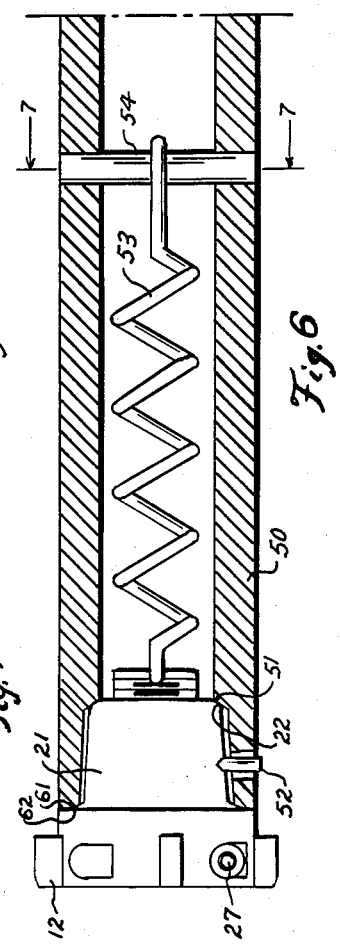
INVENTOR.
Arthur Wragg
BY Clyde H Haynes
his atty.

United States Patent Office 2,744,425
Patented May 8, 1956

2,744,425
REAMER
Arthur Wragg, South Amherst, Ohio

Application December 7, 1954, Serial No. 473,556

12 Claims. (Cl. 77—76)

This invention relates to reamers and in particular to reamers which are self-aligning in a hole to give a very smooth finish.

Many designs of reamers have been developed in the past in an attempt to provide a reamer which is adjustable and self-aligning with the hole being reamed while maintaining a smooth micro-finish in the hole. In some of these reamers a floating tool head on the end of a tool holder was provided with means for adjusting the blades radially in or out. These reamers were supposed to float sufficiently to allow the cutting edges of the blades to properly align themselves in the hole being reamed so that a smooth cylindrical micro-finish surface would be obtained. Also in these reamers set screws and other mechanisms were used to adjust the blades for the diameter of the hole being reamed. Actual experience has shown that these types of reamers did not give the high quality micro-finish surfaces which were desired and were not designed so that upwards of 75% or more of the reamer blade could be used before the blade or blades had to be discarded.

Therefore one of the objects of the present invention is to provide a reamer which is self-aligning to the hole being reamed.

Another object of the invention is to provide a reamer which will finish a hole very accurately to a micro-finish surface.

Another object of the invention is to provide a reamer in which the major part of the reamer blade can be used before the blade must be discarded.

Other objects and a fuller understanding of this invention may be had by referring to the following description and claims, taken in conjunction with the accompanying drawings in which:

Figure 1 is a cross-sectional view of a preferred design of a reamer;

Figure 2 is an end view of the reamer illustrated in Figure 1;

Figure 3 is a sectional view along the line 3—3 of Figure 1;

Figure 4 is a face view of a reamer blade used in the reamer of Figure 1;

Figure 5 is a sectional view taken along the line 5—5 of Figure 4;

Figure 6 is a sectional view of a modification of the reamer; and

Figure 7 is a sectional view along the line 7—7 of Figure 6.

In this application the term micro-finish is used to designate a smooth surface finish which is equivalent to that generally obtained by grinding the surface of a work piece with a fine grinding wheel. The reamer is used to put this micro-finish on the inside of a cylindrical hole in a work piece even though the axis of rotation of the machine supporting the reamer is out of co-axial alignment with the axis of the cylindrical surface of the hole.

The adjustable self-centering reamer illustrated in Figure 1 has a first tubular holder 10 with a reamer head 11 provided with reamer blades 12 on one end thereof and a second tubular holder 13 on the other end thereof. The tubular holders 10 and 13 are positioned in end to end relationship and are separated by a suitable bearing such as the ball bearing 14 which permits radial movement of the holder 10 relative to the holder 13. The holder 13 is adapted to be secured to a suitable rotary driving means for rotating the reamer. The holders 10 and 13 are held in bearing engagement by a rod 15 extending through the holder 13 and into the holder 10. Threadedly mounted on the end of this rod 15 is a nut 16 which is ball bearinged against the end of the holder 13. Passing through the other end of the rod 15 is a pin 17 which engages the tubular holder 10. When the nut 16 is tightened against the balls 18 and thereby against the end of the tubular holder 13 it pulls the tubular holders together against the ball bearing 14. Rotational driving force exerted on the tubular holder 13 is transmitted to tubular holder 10 by means of pin 17, rod 15, and a pin 19 which pins rod 15 to tubular holder 13. Likewise the head 11 may be pinned to the holder 10 for transmittal of rotational driving force. The ball bearings 14 and 18 permit radial displacement or movement of the holder 10 relative to the holder 13.

The reamer head 11 is provided with a shank 21 which terminates in an annular bearing surface 22 aligned to co-operate with a complementary annular bearing surface or shoulder 23 positioned internally of the tubular holder 10. The shank 21 has a co-axially extending threaded hole receiving a blade adjustment screw 24.

The reamer head 11 is also provided with a plurality of blade receiving slots 25 on the forward end thereof for holding the blades 12. These slots 25 are aligned other than radially of the head and position the blades with their cutting edges equally spaced about the head. I have found that good results are obtained when an even number of blades such as the four illustrated are used so that the head has cutting edges of the blades diametrically spaced.

All the blades 12 in a particular reamer head are of the same dimensions so that they may all be seated against a conical surface 26 on the adjusting screw 24 to position their cutting edges at the same distance of the axis from the head. After the cutting blades have been adjusted inwardly or outwardly to ream a hole of a desired diameter by turning the adjusting screw 24, set screws in the head are tightened against the faces of the blades to lock them in position.

Each blade 12 is formed into the shape illustrated in Figures 4 and 5. Each blade has a face side 28 provided with a set screw receiving recess 29 which receives its respective of the set screws 27. The cutting edge is formed by grinding into the face side with a radius sufficiently large whereby the cutting edge will shear the metal being cut. The cutting edge is provided with a lead 30 extending at about a 5° angle to the cutting edge 31. The cutting edge is also provided with an approximately 3° primary land and an approximately 8° secondary land. In this particular instance I have found it possible to provide cutting edges on both ends of each blade as illustrated in Figure 5 so that each blade may be turned around when one cutting edge becomes dull. Each blade may be reground until the total length of the blade is approximately equal to the length of the set screw recess originally put in the face 28 of the blade. Thus each blade may be used until the major portion of over 50% or in many cases 75% of the blade has been used before the blade is thrown away.

In using the reamer illustrated in Figure 1 the blades 12 are inserted in the head 11 and adjusted for the correct diameter by the adjusting screw 24. After the blades have been locked in position by tightening the set screws 27 the tubular holder 13 is secured to the spindle or other rotary driving means and the reamer is used in the same manner as other reamers. However this reamer aligns itself with the hole by means of the ball bearing 14 and the balls 18 so that the blades each do their share in cutting a micro-finish surface.

In Figures 6 and 7 I have illustrated a modification of the reamer for use in reaming a hole to a micro-finish surface. The same reamer head and reamer blades may be used as are used in Figure 1. In this instance the tubular holder 50 has an internal shoulder defining a bearing surface 51 and an end bearing surface 61. The reamer head has a complementary bearing surface 62. The annular bearing surfaces 22 and 62 on the reamer head cooperate with the bearing surfaces 51 and 61 to allow a floating action between the reamer head and the tubular holder so that the reamer head will align itself with the hole being reamed. A driving pin 52 extending through the wall of the tubular holder 50 and into the shank 21 rotates the reamer head when the tubular holder 50 is rotated. In this design the reamer head is resiliently held in the tubular holder by a tension spring 53 inter-connected between the blade adjusting screw 24 and a spring pin 54 in the tubular holder. The spring 53 has sufficient tension to keep the shank 21 in the end of the holder 50 and to cause the bearing surfaces to cooperate with the cutting edges of the blades 12 to properly align the blades with the hole being reamed. I have also found that the design of an even number of blades and the spring prevents any one blade from making too large a cut. With this design each blade shears the metal to provide a smooth micro-finish in a cylindrical hole.

It is understood that various sizes of holes may be reamed with a single reamer head by moving the blades in and out with the adjusting screw 24. If a hole is larger than the adjustment of the blades will compensate for a different head having the same general design but having different dimensions may be used. Such a head would have the same size and shape shank and annular bearing surface so that it would fit in these tubular holders. The same size blades can be used in these various diameters of heads.

Therefore, although this invention has been described in its preferred form with a certain degree of particularity, it is understood that the present disclosure of the preferred form has been made only by way of example and that numerous changes in the details of construction and the combination and arrangement of parts may be restored to without departing from the spirit and the scope of the invention as hereinafter claimed.

What is claimed is:

1. An adjustable self-centering reamer comprising, first and second tubular holders, a reamer head, reamer blades in said head, said first tubular holder supporting said reamer head at one end thereof and being fastened to said second tubular holder at the other end thereof, said other end and said second tubular holder having co-operating bearing means generally maintaining said holders in end to end relationship and allowing radial movement therebetween, a drive rod pivotally pinned to each of said holders and located co-axially of the holders and extending entirely through and outwardly beyond the end of the second tubular holder, a nut on said extending end of said rod, and bearing means between the nut and the second tubular holder.

2. An adjustable self-centering reamer comprising, first and second tubular holders, a rearmer head, reamer blades in said head, said first tubular holder supporting said reamer head at one end thereof and being fastened to said second tubular holder at the other end thereof, said other end and said second tubular holder having co-operating bearing means generally maintaining said holders in end to end relationship and allowing radial movement therebetween, a drive rod pivotally pinned to each of said holders and located co-axially of the holders and extending entirely through and outwardly beyond the end of the second tubular holder, and bearing means between the end of the tubular holder and the extending end of the rod.

3. An adjustable self-centering reamer comprising, a tubular holder having a first end to be held by a rotary drive and a second end, a reamer head, reamer blades in said reamer head, said second end of said tubular holder having a shoulder therein defining an internal annular bearing surface, said head having a shank extending in said holder and terminating in an annular bearing surface engaging said internal bearing surface, and means connecting said reamer head to said tubular holder and maintaining the bearing surfaces in movable operative contact with each other.

4. An adjustable self-centering reamer comprising, a tubular holder having a first end to be held by a rotary drive and a second end, a reamer head, reamer blades in said reamer head, said second end of said tubular holder having a shoulder therein defining an internal annular bearing surface, said head having a shank extending in said holder and terminating in an annular bearing surface engaging said internal bearing surface, an adjusting screw threaded in said shank and extending co-axially therewith, said screw terminating in a conical end engageable with the reamer blades to locate the bldaes at a desired diametrical distance from the axis of the head and having a spring engaging end, a spring in said holder engaging said screw and resiliently holding the bearing surfaces in contact, said head also having blade receiving slots receiving the blades, and means in said head holding the blades in the slots, said slots being equally spaced on said head and being positioned other than on radius lines which may be drawn on the head.

5. An adjustable self-centering reamer comprising, a holder having a first end to be held by a rotary drive and a tubular shaped second end, a reamer head, reamer blades in said reamer head, said second end of said holder having a shoulder therein defining an internal annular bearing surface, said head having a shank extending in said bore and terminating in an annular bearing surface engaging said internal bearing surface, and adjusting means in said shank, said means terminating in a conical end engageable with the reamer blades to locate the blades at a desired diametrical distance from the axis of the head, spring means betwen said shank and said holder and resiliently holding the bearing surfaces in contact.

6. An adjustable self-centering reamer comprising, a holder having a first end to be held by a rotary drive and a tubular shaped second end, a reamer head, reamer blades in said reamer head, said second end of said holder having a shoulder therein defining an internal annular bearing surface, said head having a shank extending in said bore and terminating in an annular bearing surface engaging said internal bearing surface, and adjusting means in said shank and extending co-axially therewith, said means terminating in a conical end engageable with the reamer blades to locate the blades at a desired diametrical distance from the axis of the head, spring means between said shank and said holder and resiliently holding the bearing surfaces in contact, said head also having blade receiving slots receiving the blades, and lock screws in said head holding the blades in the slots.

7. An adjustable self-centering reamer comprising, a holder having a first end to be held by a rotary drive and a tubular shaped second end, a reamer head, reamer blades in said reamer head, said second end of said holder having a shoulder therein defining an internal annular bearing surface, said head having a shank extending in said bore and terminating in an annular bearing surface engaging said internal bearing surface, and adjusting means in said shank and extending co-axially therewith, said means terminating in a conical end engageable with the reamer blades to locate the blades at a desired diametrical distance from the axis of the head, spring means between said shank and said holder and resiliently holding the bearing surfaces in contact, said head also having blade receiving slots receiving the blades, and lock screws in said head holding the blades in the slots, said slots being equally spaced on said head and positioned other than on radius lines which may be drawn on the head.

8. An adjustable self-centering reamer comprising, a tubular holder having a first end to be held by a rotary drive and a second end, a reamer head, reamer blades in said reamer head, said second end of said tubular holder having a shoulder therein defining an internal annular bearing surface, said head having a shank extending in said bore and terminating in an annular bearing surface engaging said internal bearing surface, blade adjusting means in said shank and engageable with the reamer blades to locate the blades at a desired diametrical distance from the axis of the head and having a spring engaging end, a spring in said holder engaging said means and resiliently holding the bearing surfaces in contact.

9. An adjustable self-centering reamer comprising, a tubular holder having a first end to be held by a rotary drive and a second end, a reamer head, reamer blades in said reamer head, said second end of said tubular holder having a shoulder therein defining an internal annular bearing surface, said head having a shank extending in said bore and terminating in an annular bearing surface engaging said internal bearing surface, blade adjusting means in said shank and engageable with the reamer blades to locate the blades at a desired diametrical distance from the axis of the head and having a spring engaging end, a spring in said holder engaging said means and resiliently holding the bearing surfaces in contact, said head also having blade receiving slots receiving the blades, and means in said head holding the blades in the slots, said slots being equally spaced on said head and positioned other than on radius lines which may be drawn on the head.

10. The structure of claim 1 wherein said bearing means includes ball bearings arranged to permit radial movement of one holder relative to the other holder.

11. The structure of claim 2 wherein said bearing means includes ball bearings arranged to permit radial movement of one holder relative to the other holder.

12. An adjustable self-centering reamer comprising, a holder having a first end to be held by a rotary drive and a tubular shaped second end, a reamer head adapted to support reamer blades, said second end of said tubular holder having a shoulder therein defining an internal annular bearing surface, said head having a shank extending in said holder and terminating in an annular bearing surface engaging said internal bearing surface, and means connecting said head to said holder and maintaining the bearing surfaces in movable operative contact with each other.

References Cited in the file of this patent

UNITED STATES PATENTS

| | | |
|---|---|---|
| 324,041 | Putnam et al. | Aug. 11, 1885 |
| 1,506,331 | Benko | Aug. 26, 1924 |
| 1,797,582 | McClay | Mar. 24, 1931 |
| 2,445,509 | Bouthiller et al. | July 20, 1948 |

FOREIGN PATENTS

| | | |
|---|---|---|
| 1,003,487 | France | Nov. 21, 1951 |